(12) United States Patent
Schröer et al.

(10) Patent No.: US 8,535,786 B2
(45) Date of Patent: Sep. 17, 2013

(54) WEB AND ADHESIVE STRIP

(75) Inventors: Jörn Schröer, Herdecke (DE); Gilles Schwaab, Dortmund (DE)

(73) Assignee: Ewald Dorken AG, Herdecke (DE)

( * ) Notice: Subject to any disclaimer, the term of this patent is extended or adjusted under 35 U.S.C. 154(b) by 441 days.

(21) Appl. No.: 12/305,244

(22) PCT Filed: Aug. 16, 2007

(86) PCT No.: PCT/EP2007/007219
§ 371 (c)(1),
(2), (4) Date: Dec. 17, 2008

(87) PCT Pub. No.: WO2008/019839
PCT Pub. Date: Feb. 12, 2008

(65) Prior Publication Data
US 2009/0208687 A1  Aug. 20, 2009

(30) Foreign Application Priority Data
Aug. 18, 2006 (DE) .......................... 10 2006 038 708
Sep. 20, 2006 (DE) .......................... 10 2006 044 754

(51) Int. Cl.
*B32B 3/06* (2006.01)
*B32B 7/14* (2006.01)
*E04D 5/14* (2006.01)
*E04D 11/02* (2006.01)

(52) U.S. Cl.
USPC ...... 428/194; 428/40.1; 428/41.7; 428/195.1; 428/201; 428/202; 428/212; 428/214; 428/332; 428/341; 428/343; 52/408; 52/409; 52/411; 52/746.1

(58) Field of Classification Search
USPC .................... 52/408, 409, 411, 746.1, 746.11
See application file for complete search history.

(56) References Cited

U.S. PATENT DOCUMENTS

| 3,638,381 A | 2/1972 | Robertson et al. |
| 3,881,447 A | 5/1975 | Rebentisch et al. |
| 4,324,827 A * | 4/1982 | Obayashi et al. ............. 428/192 |
| 4,495,239 A | 1/1985 | Pusch et al. |
| 4,511,619 A | 4/1985 | Kuhnel et al. |

(Continued)

FOREIGN PATENT DOCUMENTS

| BE | 1005075 A3 * | 4/1993 |
| DE | 1962640 | 6/1971 |

(Continued)

OTHER PUBLICATIONS

English Abstract of JP 06-248090 A, Sep. 1994.*

(Continued)

*Primary Examiner* — David Sample
*Assistant Examiner* — Jeff Vonch
(74) *Attorney, Agent, or Firm* — Jason H. Vick; Sheridan Ross, PC (57) ABSTRACT

Represented and described is a sheet having at least one fastening section for the bonding of the sheet to a substrate or for bonding to a further sheet. In accordance with the invention the fastening section is coated partially with an adhesive and has at least two bonding regions formed by the adhesive coating, and adjacent bonding regions are separated from one another at least partly by at least one adhesive-free region of the fastening section.

15 Claims, 6 Drawing Sheets

(56) References Cited

U.S. PATENT DOCUMENTS

| | | | |
|---|---|---|---|
| 4,684,568 A | 8/1987 | Lou | |
| 4,714,651 A | 12/1987 | Hartmann et al. | |
| 4,762,744 A | 8/1988 | Woiceshyn et al. | |
| 4,911,975 A | 3/1990 | Schult | |
| 4,945,697 A | 8/1990 | Ott et al. | |
| 5,431,343 A | 7/1995 | Kubiak et al. | |
| 5,489,462 A | 2/1996 | Sieber | |
| 5,508,093 A | 4/1996 | Mehdorn | |
| 5,612,114 A | 3/1997 | Zalewski et al. | |
| 5,775,039 A | 7/1998 | McPherson | |
| 5,860,259 A | 1/1999 | Laska | |
| 6,672,016 B2 | 1/2004 | Janesky | |
| 6,925,766 B2 | 8/2005 | Di Pede | |
| 7,776,417 B2 * | 8/2010 | Mohseen et al. | 428/40.1 |
| 7,862,854 B2 * | 1/2011 | Kerkar et al. | 427/207.1 |
| 2002/0020142 A1 | 2/2002 | Swiszcz et al. | |
| 2002/0121061 A1 * | 9/2002 | Rippey | 52/408 |
| 2003/0219563 A1 * | 11/2003 | Zanchetta et al. | 428/40.1 |
| 2007/0187032 A1 * | 8/2007 | Wang | 156/327 |
| 2008/0086958 A1 | 4/2008 | Schroer | |
| 2008/0227350 A1 | 9/2008 | Schroer et al. | |
| 2009/0041999 A1 | 2/2009 | Schroer | |

FOREIGN PATENT DOCUMENTS

| | | |
|---|---|---|
| DE | 2510162 | 9/1976 |
| DE | 2947499 | 6/1981 |
| DE | 3302244 | 7/1984 |
| DE | 3432813 | 3/1985 |
| DE | 3342560 | 6/1985 |
| DE | 3150021 | 11/1987 |
| DE | 3843574 | 3/1990 |
| DE | 9405349 | 6/1994 |
| DE | 4326437 A1 * | 2/1995 |
| DE | 9404700 | 7/1995 |
| DE | 29602475 | 4/1996 |
| DE | 29805622 | 4/1998 |
| DE | 19910420 | 10/1999 |
| DE | 20005974 U1 | 6/2000 |
| DE | 20012227 U1 | 11/2000 |
| DE | 19916772 | 12/2000 |
| DE | 20111595 | 10/2001 |
| DE | 20207877 | 9/2002 |
| DE | 10128078 A1 | 1/2003 |
| DE | 20217044 | 6/2003 |
| DE | 10201152 | 8/2003 |
| DE | 10314764 | 10/2004 |
| EP | 0169308 | 1/1986 |
| EP | 0287078 | 10/1988 |
| EP | 0570215 | 11/1993 |
| EP | 1586721 | 10/2005 |
| EP | 1941994 A1 * | 7/2008 |
| JP | 06248090 A * | 9/1994 |
| WO | WO 82/03099 | 9/1982 |
| WO | WO 97/30244 | 8/1997 |

OTHER PUBLICATIONS

Machine Translation of DE 10128078 A1, Jan. 2003.*
Machine Translation of BE 1005075 A3, Apr. 1993.*
Official Action for U.S. Appl. No. 11/873,656, mailed Jan. 7, 2011.
Official Action for U.S. Appl. No. 11/996,517, mailed Jan. 4, 2011.
Official Action for U.S. Appl. No. 11/996,517, mailed Jun. 30, 2010.
International Search Report prepared by the European Patent Office on Jan. 7, 2008, for International Application No. PCT/EP2007/007219.
Official Action for U.S. Appl. No. 11/873,656, mailed Sep. 3, 2009.
Official Action for U.S. Appl. No. 11/873,656, mailed Mar. 30, 2010.
Official Action for U.S. Appl. No. 11/911,994, mailed Aug. 21, 2009.
Official Action for U.S. Appl. No. 11/911,994, mailed Apr. 12, 2010.
Official Action for U.S. Appl. No. 11/996,517, mailed Apr. 19, 2010.
International Preliminary Report on Patentability (including translation) for International (PCT) Patent Application No. PCT/EP2007/007219, issued Feb. 24, 2009.
Rouette, H.K., Handbuch Textilveredelung: Technologie, Verfahren und Maschinen, Bank II 14. Aufl. Frankfurt am Main: Deutscher Fachverlag (2003), pp. 848-850.
Giessman, A., Substrat-und Textilbeschichtung: Paxiswissen fur Textil-, Bekleidungs-und Beschichtungsbetriebe, Berlin (u.a.): Springer 2003, pp. 51-53.

* cited by examiner

WEB AND ADHESIVE STRIP

CROSS REFERENCE TO RELATED APPLICATIONS

This application is a national stage application under 35 U.S.C. 371 of PCT Application No. PCT/EP2007/007219 having an international filing date of 16 Aug. 2007, which designated the United States, which PCT application claimed the benefit of German Application Nos. 102006038708.2 filed 18 Aug. 2006, and 102006044754.9 filed 20 Sep. 2006, the entire disclosure of each of which are hereby incorporated herein by reference.

The invention relates to a sheet having at least one fastening section for the bonding of the sheet to a substrate or for bonding to a further sheet. The invention further relates to an adhesive tape having at least one fastening section for the bonding of a sheet to a substrate or for bonding to a further sheet.

Sheets that are used in the construction sector must be bonded to one another or to other materials and/or substrates. The sheets that are used in the construction sector may be, for example, underlay felts, underlay sheets, formwork sheets and window flashings, used in the outside area of pitched roofs. In the inside area of pitched roofs, wind barriers, vapour barriers, vapour retarders and window flashings are employed. In the case of flat roofs, sealing sheets, vapour barriers and vapour retarders are used. Façade sheets, housewraps and window flashings are needed in the façade area. Furthermore, in the case of foundation walls and foundation slabs, sealing sheets and masonry barriers are used. The sheets that are used in the roof area or façade area are joined to one another in such a way as to be airtight and windproof, and are intended to ensure watertightness and airtightness. The sheets that are used in the area of foundation walls and foundation slabs, in contrast, are intended essentially to ensure watertightness.

In order to join the aforementioned sheets to one another or to a substrate it is possible to use adhesive tapes. Furthermore, the sheets themselves may have an adhesive coating which allows bonding to a substrate or to a further sheet. Self-adhesive sheets may have an adhesive coating on one side or both sides. In the case of double-sided adhesive coating, the layer of adhesive on one sheet can be bonded to the layer of adhesive on an opposing sheet, in order to ensure joining of the sheets.

The self-adhesive sheets known from the prior art or the adhesive tapes used to bond the sheets have a coating with an adhesive over their full area in order to ensure bonding of the sheets with high strength and sufficient sealing or imperviousness. Furthermore, it is necessary to apply a comparatively large quantity of adhesive in order to ensure an airtight and windproof join of the sheets to the substrate or to one another and/or to ensure watertightness. This is especially so when the sheets are to be bonded to surfaces which are hydrophobicized, soiled or in another way are less suitable for bonding. Moreover, the known sheets generally do not have smooth surfaces, and so, when the sheets are bonded, some of the adhesive penetrates into the surface and does not take part in the formation of an adhesive bond between the sheet and the substrate or a further sheet. This is true in particular in the case of sheets having fibrous surfaces.

Where two sheets are to be bonded to one another with application of adhesive on both sides, there is the problem, furthermore, that the sheets must be aligned very precisely in order to bring the bonding regions at least predominantly into congruence with one another.

It is an object of the present invention to provide a sheet and an adhesive tape, each of the types specified at the outset, with which the bonding of the sheet to a substrate or bonding to a further sheet can be accomplished easily and inexpensively, the intention being that the adhesive bond obtainable by bonding should have a high peel strength and sealing or imperviousness.

In achievement of the aforementioned object, in a first embodiment of the invention the fastening section of the sheet or of the adhesive tape is coated partially with an adhesive and has at least two bonding regions formed by the adhesive coating, and adjacent bonding regions are separated from one another at least partly by at least one adhesive-free region of the fastening section. The basic idea of the invention can be seen as being to coat the fastening section with an adhesive only at particular regions. In the course of peel experiments it was found, surprisingly, that, even in the case of only partial adhesive coating in the fastening section, the peel strength produced is of a level comparable with that of sheets which have a coating of an adhesive over the full area of the fastening section. In peel measurements it was possible, on a strip-shaped fastening section 50 mm wide, for example, with a testing speed of 100 mm/min, to achieve strengths of 3 to 200 N, more particularly of 7 to 100 N, more particularly still of 10 to 70 N. Owing to the partial coating of the fastening section, in accordance with the invention, it is possible to save on adhesive, and this contributes to a reduction in the production costs of the sheet of the invention. It will be understood that the preceding embodiments also apply in the same way to an adhesive tape having a fastening section, the fastening section being coated only partially with an adhesive, and bonding regions being separated from one another by adhesive-free regions of the fastening section.

The fastening section may extend preferably in the lengthwise direction of the sheet, in the form of stripes on one or both outside edges and/or on the top and/or bottom face of the sheet, preferably over the entire length of the sheet. In principle it is of course also possible for the fastening section to extend crosswise to the lengthwise direction of the sheet, preferably over the entire width, on the bottom and/or top face of the sheet.

In an alternative embodiment of the invention, in achievement of the aforementioned object, the fastening section of the sheet or of the adhesive tape is coated over its full area with an adhesive and has at least two bonding regions formed by the adhesive coating, and adjacent bonding regions have a different thickness of application of the adhesive coating. At this point the basic concept underlying the invention is that of obtaining a saving in adhesive by not coating the fastening section at all of its points with the same application thickness.

The bonding regions with different application thickness of the adhesive coating may preferably be directly adjacent to one another or else, where appropriate, may be separate from one another as a result of adhesive-free regions of the fastening section. The different application thickness of the adhesive coating contributes to the bonding of the sheet or of the adhesive tape to non-planar substrates, fibrous substrates for example, or to a further sheet having a non-planar surface being possible even when the amount of adhesive applied to the fastening section is lower overall. In this context it is advantageous that more adhesive is available for bonding locally, at points of bonding regions with a greater application thickness. Where the fastening section of one sheet is to be bonded to the fastening section of a further sheet, it is of advantage, furthermore, that the sheets to be bonded need not be aligned precisely with one another in order to ensure bonding. If the sheets are not precisely aligned with one another, it may be the case that bonding regions with a high application thickness, on one sheet, become bonded to bonding regions having a lower application thickness, on the other sheet. In any case it is possible in this way to ensure high strength on the part of the adhesive bond. The aforementioned advantages apply equally for an adhesive tape of the type according to the invention.

Elucidated below in detail are advantageous embodiments of the invention, using a sheet of the invention as an example. It will be understood that the features identified below can also be of advantage, and provided, in the case of an adhesive tape of the type according to the invention, even when this is not described specifically.

In order to ensure airtightness/windproofness and watertightness, it is necessary to obtain at least one continuous path of the bond when the sheet is bonded to the substrate or when the sheets are bonded to one another. In order to ensure high sealing or imperviousness, it is also possible, in particular, for there to be two continuous paths of the bond. In one preferred embodiment of the invention, therefore, the bonding regions are formed and/or disposed in such a way that, when the sheet is bonded to the substrate or to a further sheet, over the entire length and/or the entire width of the sheet, a substantially uninterrupted adhesive bond is formed between at least one bonding region and the substrate or the further sheet. In this context the formulation "substantially uninterrupted" makes it clear that, under certain circumstances, it is sufficient, for sufficient sealing or imperviousness, for the bonding region to be bonded essentially completely to the substrate or to the further sheet, and for only a section, or a few sections, of the bonding region not to be bonded to the substrate or the further sheet over a short length of, for example, a few centimeters. It is, however, of advantage if a completely uninterrupted adhesive bond is formed.

Preferably, for the aforementioned purpose, the bonding regions of the sheet may extend uninterruptedly over the entire sheet length and/or the entire sheet width. Through a suitable arrangement of the bonding regions, their width and shape, and also by suitable specification of the application thickness, it is possible, if the adhesive is selected appropriately, to ensure an airtight and/or watertight adhesive bond.

For ease of bonding of the sheet to a further sheet, it is possible for at least one fastening section to be provided on the top face and on the bottom face of the sheet. It is possible for a sheet to have a partial adhesive coating on both sides, in accordance with the first-described embodiment of the invention. It is equally possible for there to be a partial adhesive coating on one side and a full-area adhesive coating on the other side, in particular in accordance with the alternative embodiment of the invention. By way of example, provision may further be made for a fastening section provided on the top face to have a different width from a fastening section provided on the bottom face of the sheet. Here it is possible for a comparatively wide fastening section on the top face of a sheet to be bonded to a comparatively narrow fastening section on the bottom face of a further sheet, the sheets that are bonded to one another overlapping at least in the region of the fastening sections. As a result of different widths on the part of the fastening sections, it is not necessary to align the sheets with one another with any great precision, in order for the fastening sections to be brought into congruence with one another at least predominantly. Even if alignment of the sheets and/or of the fastening sections is not precise, it is possible to ensure an airtight/windproof adhesive bond and a high level of watertightness in conjunction with sufficient strength of the adhesive bond.

Preferably the bonding regions are disposed with regular spacings with respect to one another and/or with a defined pattern. By way of example, it is possible for bonding regions and unbonded regions of the fastening section to be provided alternately alongside one another. The same also applies, of course, for bonding regions having a different application thickness of the adhesive coating, which may likewise be disposed alternately alongside one another. As a result, the bonding of the sheets, especially to one another, is simplified and a high strength and sealing or imperviousness of the adhesive bond is ensured.

The bonding region may be designed with a linear form, in which case, preferably, the fastening section may have a plurality of bonding regions which are straight or are linear and lie adjacent to one another in a wave-like way. For example, there may be straight linear bonding regions alongside one another, it being possible for the bonding regions to extend over the entire length of the sheet and to be separated from unbonded regions of the fastening section crosswise with respect to the lengthwise direction. In the case of the embodiment described above, the bonding regions of the sheet extend uninterruptedly over the entire sheet length. It may also be the case, however, that the bonding regions have interruptions and are disposed with an offset to one another, crosswise with respect to the lengthwise direction, with the overall result, again, that is possible to ensure an airtight/windproof bond and/or the watertightness of the adhesive bond. Equally it is possible for the fastening section to be coated with the adhesive in a net-like way. Here again, by virtue of the net structures, a continuous path of the bond is produced that ensures airtightness/windproofness and watertightness. In this context, the bonding regions may have a width of 0.5 to 30 mm, preferably of 1 to 15 mm, more particularly of 1.5 to 8 mm.

Where linear bonding regions have been provided, all of the bonding regions have the same width. It will be understood that bonding regions having different widths may also be provided, especially on different outside faces of the sheet. The width of the linear bonding regions depends on their number per fastening section and on the technique by which the adhesive is applied, the application of adhesive being possible by means of (flow) nozzles, rolls or spray nozzles. It is also possible for the adhesive to be applied to the fastening section by rotational spraying or melt blowing.

Alternatively the fastening section may also have a plurality of bonding regions in the form of spirals or Ω structures. In this case the spiral or Ω structures are disposed such that, on bonding, again, at least one continuous path of the bond is produced. The bonding regions may have a relatively low width, since, by virtue of the spiral structure or Ω structure, when the sheet is bonded to a substrate or to a further sheet, a plurality of continuous paths of the bond are obtained. The width of the lines of adhesive that form the spiral or Ω structure may here be 0.1 to 5 mm, preferably 0.3 to 3 mm, more particularly 0.5 to 2 mm. Moreover, it is also possible for there to be lines of adhesive having different widths.

Where the adhesive is sprayed in fibre form onto the fastening section, the fastening section may have adhesive fibres, applied preferably in a randomised way, with a diameter of 0.001 to 2 mm, preferably of 0.005 to 1 mm, more particularly of 0.01 to 0.5 mm.

Lastly, by means of suitable application methods, it is possible to produce bonding regions in the form of straight or wave-like lines, net-like bonding regions or bonding regions in the form of spirals or Ω structures.

The width of the fastening section can be 5 to 150 mm, preferably 10 to 100 mm, more particularly 20 to 80 mm. In this case the fastening section may be on the long edges and/or on the transverse edges of the sheet. As has already been indicated, it is possible for fastening sections having different widths to be present on the top face and on the bottom face of the sheet, in order to simplify the bonding of the sheets to one another.

The application weight of the adhesive coating, based on the fastening section, can be 5 to 500 g/m$^2$, preferably 20 to 300 g/m$^2$, more particularly 35 to 200 g/m$^2$. This makes it possible to ensure a sufficiently firm bond and a high level of sealing or imperviousness of the adhesive bond.

Suitable adhesives are systems known per se from the prior art, such as hotmelts, dispersions and solvent-based adhesives or the like, which may also have been crosslinked. The adhesives may comprise additives such as, for example, UV stabilizers, antioxidants, flame retardants or the like.

The coverage of the fastening section with an adhesive coating may be 5% to 90%, preferably 10% to 70%, more particularly 20% to 50%, based on the total surface area of the fastening section. In the case of full-area coating of the fastening section, in contrast, the coverage of the fastening section with bonding regions which have a substantially equally higher application thickness can be 5% to 90%, preferably 10% to 70%, more particularly 20% to 50%, based in each case on the total surface area of the fastening section. In the case of the last-described embodiment, therefore, the coverage refers to the bonding regions with a higher application thickness, which protrude outwardly in relation to other bonding regions with a lower application thickness. The coverages chosen are sufficient to allow the sheet to be bonded to a substrate or to a further sheet with a high strength of the adhesive bond and with sufficient sealing or imperviousness.

For the protection of the fastening section, it may, in the non-service state, have a removable protective film stuck to it, which must be removed prior to the bonding of the sheet.

As has already been indicated, all of the features described in connection with a sheet of the invention may also be actualized directly in the case of an adhesive tape of the invention, and lead to the corresponding advantages.

Below, a description is given of preferred embodiments of the invention:

EXAMPLE 1

A conventional underlay sheet with the trade name Delta Vent S from the applicant, consisting of an assembly of 40 g/m$^2$ PP nonwoven, 40 g/m$^2$ of microporous membrane and 70 g/m$^2$ PP nonwoven, is coated on one side at one edge with a stripe 30 mm wide of a hotmelt having the trade name Kleiberit SK 728.6, from the company Kleiberit, to give the fastening section. The weight per unit area is 150 g/m$^2$. Application takes place from a slot die with an installed comb structure, producing six bonding regions in stripe format, each with a width of 3 mm.

EXAMPLE 2

The sheet of Example 1 is additionally coated at the other edge with a hotmelt stripe 80 mm wide, with a weight per unit area of 50 g/m$^2$, to give the fastening section. This is done using a similar but wider die, which in the course of application is moved orthogonally in relation to the edge of the sheet, with a deflection of 10 mm. The sheet is moved along beneath the die. This produces wave-like bonding lines with a width of about 4 mm, which on bonding with straight-running linear bonding regions of another sheet form continuous bonding paths.

EXAMPLE 3

A conventional façade sheet with the trade name Delta Fassade, from the applicant, consisting of an assembly of 120 g/m$^2$ PET nonwoven with an 80 g/m$^2$ microporous coating, is coated on the coating side, in a rhomboidal net format, using an engraved roller, with a hotmelt having the trade name Eukalin 571, from the company Kleiberit, in a width of 70 mm, to give the fastening section. The width of the individual net lines is 10 mm and the weight per unit area is 45 g/m$^2$ in relation to the fastening section as a whole.

EXAMPLE 4

The sheet from Example 3 is additionally coated on its opposite edge, over the full area, with a hotmelt, with a weight per unit area of 100 g/m$^2$, the resulting fastening section having a width of 4 cm.

EXAMPLE 5

A conventional housewrap having the trade name Vindsperre from the company Nortett, consisting of an assembly of 35 g/m$^2$ PP nonwoven, 40 g/m$^2$ microporous membrane and 17 g/m$^2$ PP nonwoven, is sprayed on both sides, using the spray nozzle of a system having the trade name Dynafiber from the company ITW Dynatec, with a 40 mm wide stripe of a hotmelt having the trade name Kleiberit SK 728.6 from the company Kleiberit, thus giving a stripe 50 mm wide as a fastening section. The weight per unit area is 20 g/m$^2$. Depending on the setting of the spraying parameters, adhesive fibre diameters of 0.01-0.5 mm are obtained.

EXAMPLE 6

A conventional vapour retarder with the trade name Delta Luxx, from the applicant, consisting of an assembly of 80 g/m$^2$ PP nonwoven with 80 g/m$^2$ EVA coating, is coated in spiral format on the nonwoven side with a hotmelt having the trade name Lunamelt PS 3648 from the company H.B. Fuller, in a width of 10 mm. The weight per unit area is 150 g/m$^2$ and the width of the lines of adhesive is 1 mm.

EXAMPLE 7

A conventional sealing sheet with the trade name Delta Protekt, from the applicant, consisting of an assembly of four plies of 55 g/m$^2$ PP nonwoven with three plies of EVA/PE film arranged between them, with a total weight per unit area of 800 g/m$^2$, is coated on both sides in net format, using an application roll, with a solvent-based acrylate adhesive, and dried. The dry weight per unit area of the stripe-shaped fastening section is 100 g/m$^2$ in each case.

EXAMPLE 8

A conventional bitumen sealing sheet is coated on one side in accordance with Example 7.

EXAMPLE 9

A conventional masonry barrier, from the applicant, consisting of a mixture of PP/EVA/PE with a weight per unit area of 400 g/m$^2$, is coated on both sides with three straight lines of adhesive, each 5 mm in width, over a total width of 30 mm. This is done using a hotmelt having the trade name Helmitherm L99/32-26, from the company Forbo. The weight per unit area of the stripe-shaped fastening section is 70 g/m².

EXAMPLE 10

A single-sidedly siliconised PE carrier film is coated in a net-like way on the silicone-free side with an acrylate adhesive dispersion and is dried and slit to give an adhesive tape having a width of 60 mm. The weight per unit area of the adhesive is 140 g/m², and the lines of the adhesive applied in a net-like way have widths of 1 mm, 1.5 mm and 2 mm.

In detail, there are a multiplicity of possibilities for designing and developing the sheet of the invention and the adhesive tape of the invention, with reference being made on the one hand to the dependent claims and on the other hand to the following description of one preferred exemplary embodiment of the invention with reference to the drawing. Moreover, as and when necessary, the invention allows the features represented and disclosed below on the basis of the drawing, and/or in the claims, to be combined with one another, even when such combination is not specifically described. In the drawing.

FIG. 1 depicts a sheet 1 having a fastening section 2 on the top face of the sheet 1 and having a further fastening section 3 on the bottom face of the sheet 1, the fastening sections 2, 3 being provided for the bonding of the sheet 1 to a further sheet 1, not depicted, or for bonding to a substrate, not depicted. The fastening sections 2, 3 are partially coated with an adhesive and have a plurality of bonding regions 4, 5 formed by the adhesive coating. The bonding regions 4, 5 extend in the lengthwise direction of the sheet 1 at the outside edges over the entire length of the sheet 1. The bonding regions 4, 5 take the form of straight lines of adhesive which are separated from one another by adhesive-free regions 6, 7. As a result of this it is possible to lower the consumption of adhesive when coating the fastening section 2, 3 by comparison with the sheets known from the prior art, contributing to a significant cost saving. Nevertheless, continuous bonding of the sheet 1 to a substrate or to a further sheet is possible, with an airtight and watertight adhesive bond of high strength being formed over the entire sheet length.

Figure 1A:
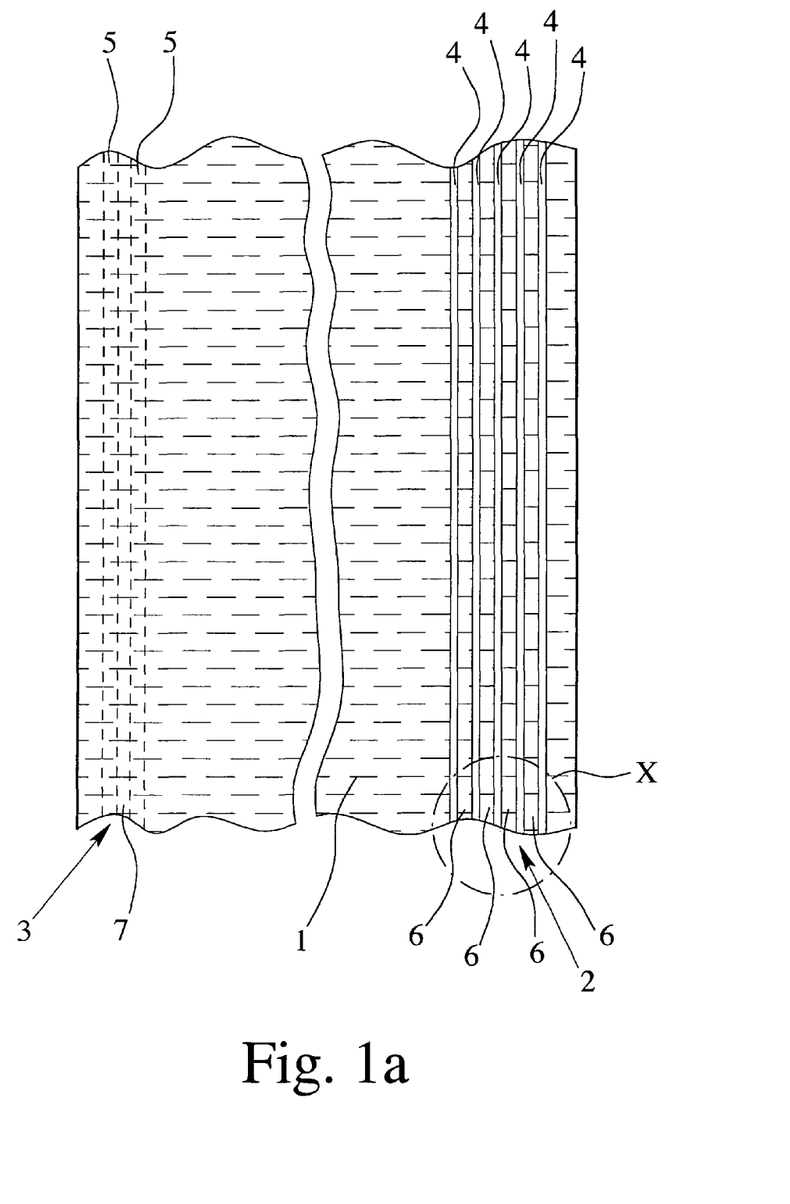
FIG. 1a shows a plan view of a section of a sheet of the invention, with bonding regions which have lines of adhesive running straight.

The sheet 1 has on the top face the fastening section 2, which transversely with respect to the lengthwise direction of the sheet 1 is limited by the two outer bonding regions 4. On the bottom face of the sheet 1 there is the fastening section 3, which has only two fastening regions 5, separated from one another by one adhesive-free region 7. As a result, the width of the fastening section 2 on the top face of the sheet 1 is greater than the width of the fastening section 3 on the bottom face of the sheet 1. Where sheets 1 are bonded to one another with an overlap, an adhesive bond is formed between the fastening section 2 on the top face of the sheet 1 and a fastening section 3 on the bottom face of a further sheet 1. The difference in width between the fastening sections 2 and 3 makes it possible to bond overlapping sheets 1 to one another without a need for the fastening sections 2, 3 to be aligned precisely with one another in order to ensure an airtight and watertight adhesive bond of high strength.

Figure 1B:
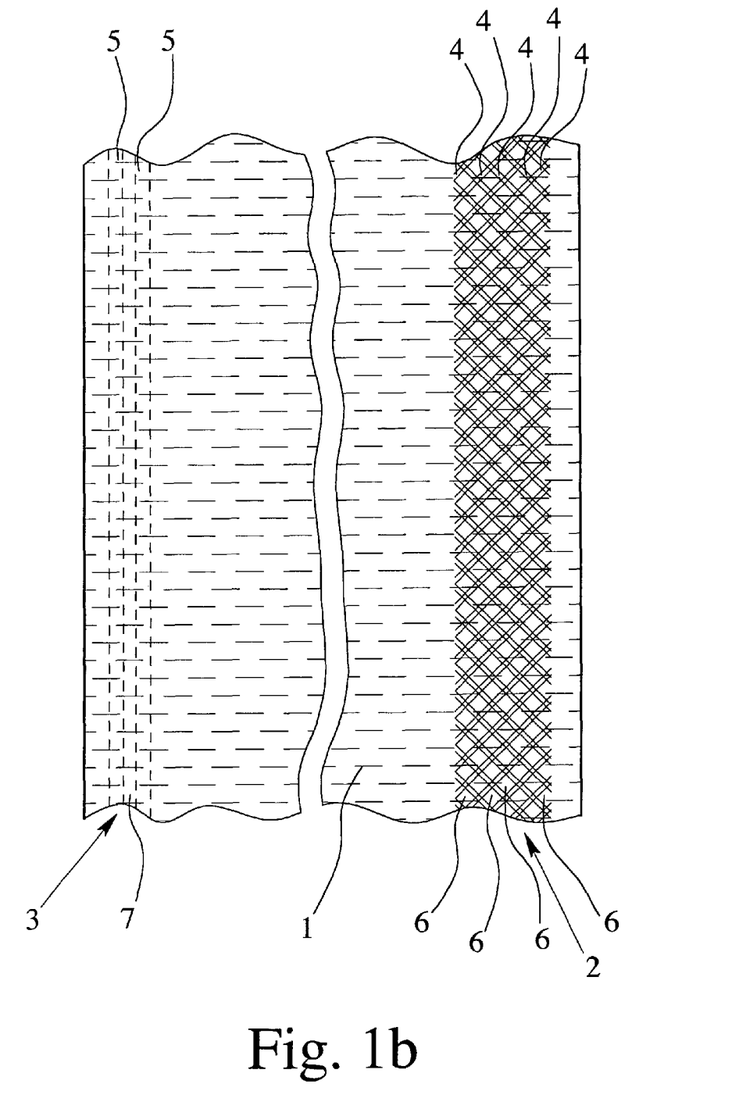
FIG. 1b shows a plan view of a section of a sheet of the invention, with lines of adhesive arranged in a net-like way on the top face, and lines of adhesive running straight on the bottom face.
Figure 1C:
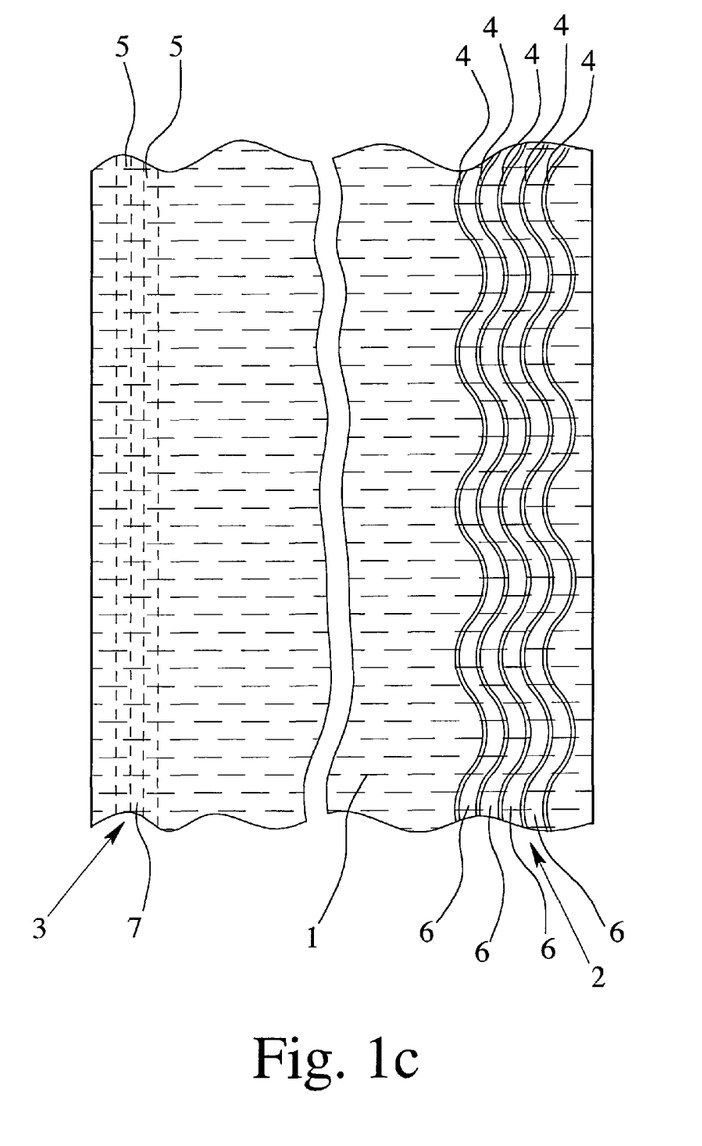
FIG. 1c shows a plan view of a section of a sheet of the invention, with lines of adhesive running in the form of waves on the top face, and lines of adhesive running straight on the bottom face.
Figure 1D:
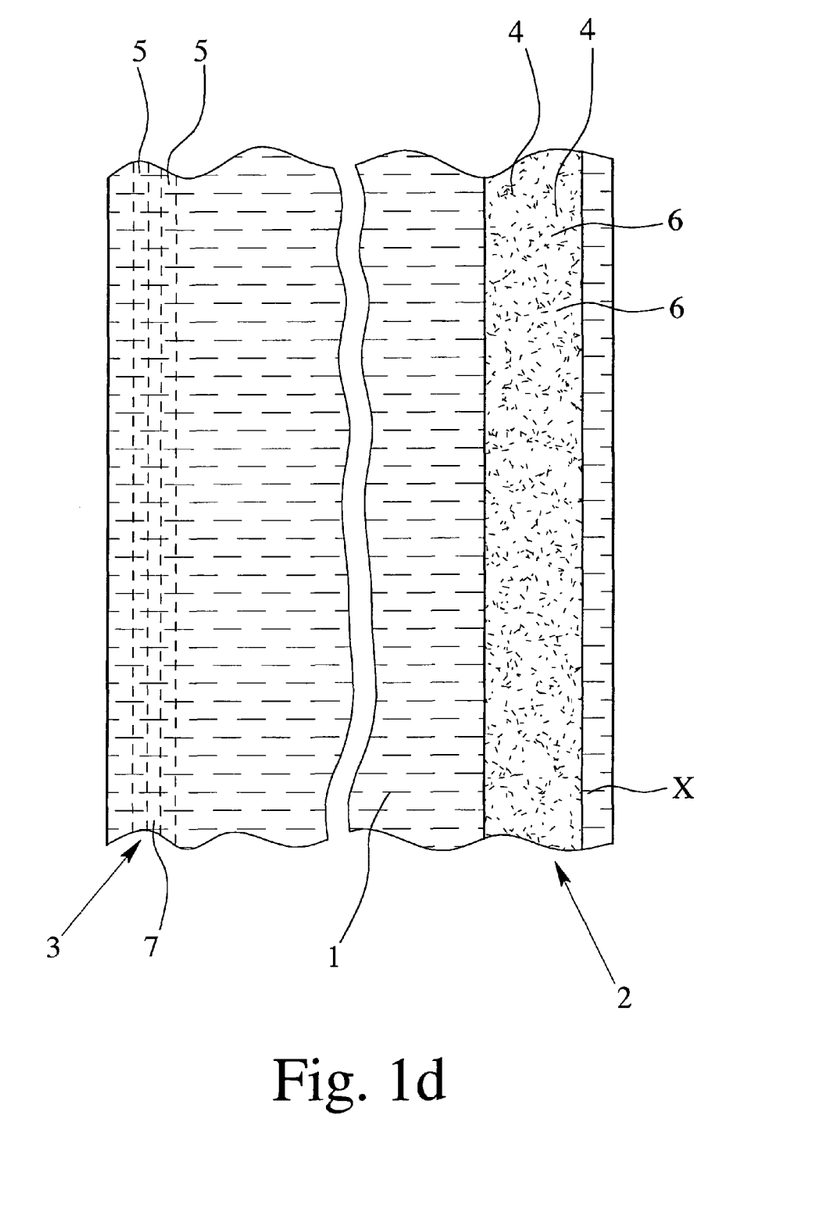
FIG. 1d shows a plan view of a section of a sheet of the invention, with, on the top face, a bonding region formed by spray-applied adhesive fibres, and with straight lines of adhesive on the bottom face.
Figure 1E:
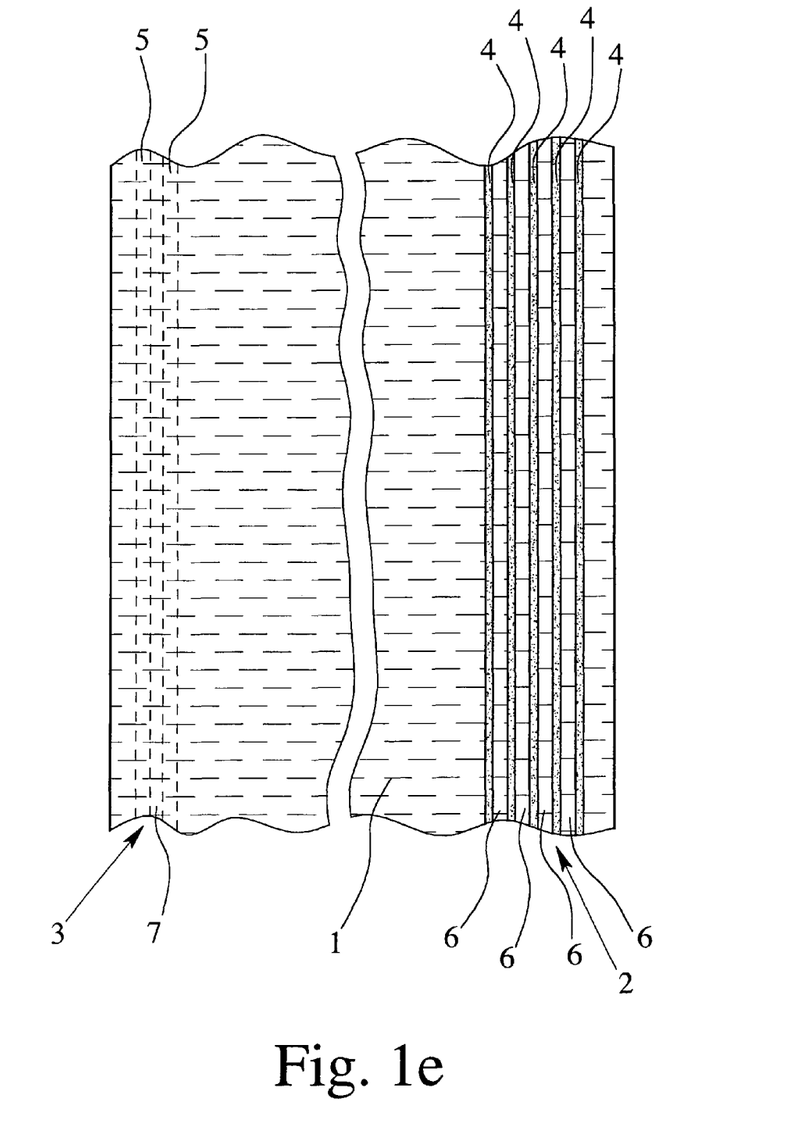
FIG. 1e shows a plan view of a section of a sheet according to another exemplary embodiment of the invention

Depicted in each of FIG. 1b to FIG. 1e is a plan view of a section of a sheet of the invention, the bonding regions 4 being overlaid on one another in a net-like way in accordance with FIG. 1b and being designed as lines of adhesive which run in a wave form in accordance with FIG. 1c. In accordance with FIG. 1d, provision is made for the fastening section 2 to extend over a relatively great width on the top face of the sheet 1, and to be obtainable by spray application of adhesive fibres. The adhesive-free regions 6 of the fastening section 2 are formed by the empty spaces which come about when adhesive fibres are sprayed onto the top face of the sheet 1. The size of the adhesive-free regions 6 of the fastening section 2 is therefore determined by the spraying parameters when the adhesive fibres are sprayed on. As a result, the fastening region 2 is sprayed "over its full area" with adhesive fibres, which do not, however, completely cover the top face of the sheet 1 in the region of the fastening section 2. The discrete regions of the coating are generated by the individual adhesive fibres themselves. In the case of the sheet depicted in FIG. 1e, the fastening section 2 has a plurality of bonding regions 4, which are likewise obtainable by spray application of adhesive fibres.

Figure 2:
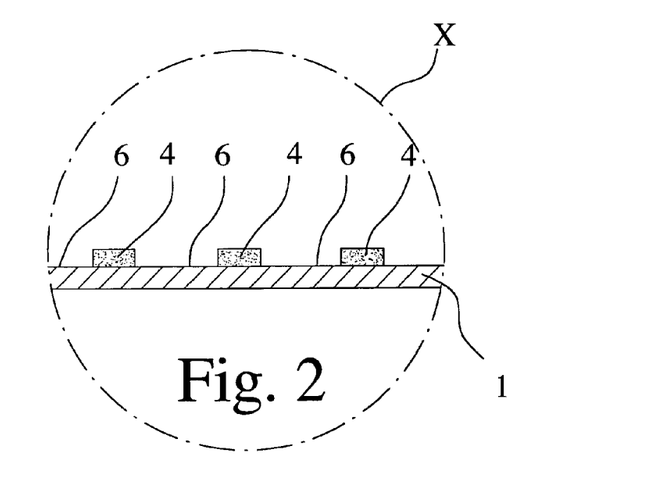
FIG. 2 shows a view of the detail X from FIG. 1

FIG. 2 depicts a partial cross-sectional view of the sheet 1 in the region of the fastening section 2. As is evident in particular from FIG. 2, all of the bonding regions 4 have the same width. The adhesive-free regions 6, in contrast, have a greater width than the bonding regions 4. It is also possible for the bonding regions 4 and the adhesive-free regions 6 to be equally wide.

Figure 3:
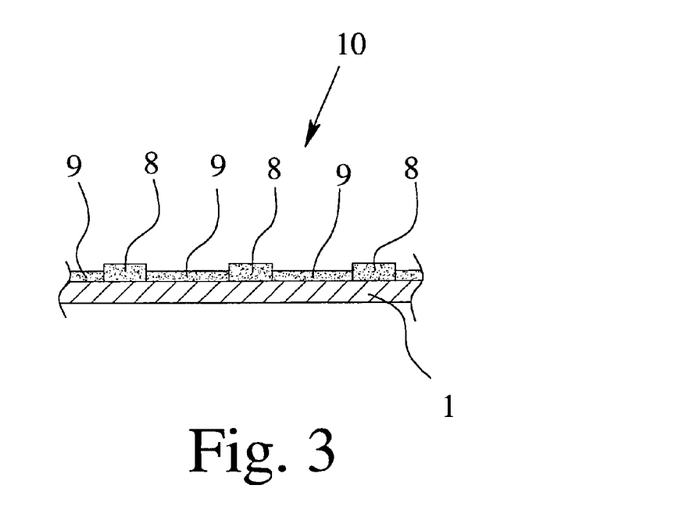
FIG. 3 shows a partial cross-sectional view of another embodiment of a sheet of the invention.

FIG. 3 depicts a partial cross-sectional view of a further embodiment of a sheet 1. The bonding regions 8, 9 form a fastening section 10 for the bonding of the sheet 1 to a substrate or for bonding to a further sheet 1. The fastening section 10 is coated over its full area with an adhesive, the bonding regions 8, 9 that are formed by the adhesive coating having a different application thickness of the adhesive coating. This allows the sheet 1 to be bonded even to non-planar surfaces, with a level of adhesive consumption which is lower overall as compared with the bonding of sheets which have an adhesive coating with a constant application thickness over the entire fastening section.

The invention claimed is:

1. A construction material comprising:
a first sheet having a first fastening area on a top face of the sheet, and a further fastening area on a bottom face of the sheet, the first fastening area is located from substantially a top edge of the top face of the sheet to a bottom edge of the top face of the sheet, and the further fastening area is located from substantially the top edge of the bottom face of the sheet to the bottom edge of the bottom face of the sheet, wherein the first fastening area and the further fastening area are partially coated with an adhesive, the first fastening area and the further fastening area each comprising:
at least two bonding regions, each bonding region extending from adjacent to the top edge to adjacent to the bottom edge, wherein adjacent bonding regions are separated from one another by at least one adhesive-free region, the adhesive-free region also extending from adjacent to the top edge to adjacent to the bottom edge and formed such that, in an operative state, a third fastening area on second, substantially similar sheet is bonded to the first fastening area by adhesion of at least one bonding region of the third fastening area to an adhesive-free region of the first fastening area wherein the material is at least one of air-tight, wind-proof, and water-tight, and wherein at least one of the at least two bonding regions is narrower than the at least one adhesive-free region.

2. The construction material according to claim 1, wherein at least one bonding region extends uninterruptedly over its respective entire sheet.

3. The construction material according to claim 1, wherein a plurality of airtight and/or watertight adhesive bonds are formed.

4. The construction material according to claim 1, wherein at least one fastening area is provided on both faces of the sheets.

5. The construction material according to claim 1, wherein fastening areas having different widths are provided on different faces of at least one sheet.

6. The construction material according to claim 1, wherein all of the bonding regions have an equal width.

7. The construction material according to claim 1, wherein some of the bonding regions have an equal width.

8. The construction material according to claim 1, wherein some of the bonding regions do not have an equal width.

9. The construction material according to claim 1, wherein one bonding region has a width of 0.5 to 30 mm.

10. The construction material according to claim 1, wherein at least one fastening area includes adhesive fibres, applied in a randomized way, having a diameter of 0.001 to 2 mm.

11. The construction material according to claim 1, wherein a width of one fastening area is 5 to 150 mm.

12. The construction material according to claim 1, wherein an applied weight of the adhesive is 5 to 500 g/m$^2$.

13. The construction material according to claim 1, wherein a coverage of at least one fastening area with the adhesive is 5% to 90%, relative to a total surface area of the respective fastening area.

14. The construction material according to claim 1, wherein a coverage of at least one fastening area with bonding regions, having equal or different application thicknesses, is 5 to 90%5% to 90%, relative to a total surface area of the respective fastening area.

15. The construction material according to claim 1, wherein in a non-service state, the first fastening area further comprises a removable protective film adhered thereto.

* * * * *